US012682395B2

(12) United States Patent
Sangode et al.

(10) Patent No.: US 12,682,395 B2
(45) Date of Patent: Jul. 14, 2026

(54) SYSTEM AND METHOD FOR DETECTING BIAS AND PERFORMING DEBIASING

(71) Applicant: Morgan Stanley Services Group Inc., New York, NY (US)

(72) Inventors: Asit Sangode, Livingston, NJ (US); Tejaswi Sutrala, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/464,875

(22) Filed: Sep. 11, 2023

(65) Prior Publication Data

US 2025/0086707 A1 Mar. 13, 2025

(51) Int. Cl.
*G06Q 40/03* (2023.01)
(52) U.S. Cl.
CPC .................................... *G06Q 40/03* (2023.01)
(58) Field of Classification Search
None
See application file for complete search history.

(56) References Cited

U.S. PATENT DOCUMENTS 10,671,942 B1 6/2020 McGovern et al.
11,296,971 B1 * 4/2022 Jain ......................... H04L 41/22

2019/0147371 A1 5/2019 Deo et al.
2020/0311090 A1 10/2020 Pichaimurthy et al.
2021/0287119 A1 * 9/2021 Rink .................. G06Q 30/0201
2022/0284242 A1 9/2022 Kim et al.
2023/0222378 A1 * 7/2023 Romaniello ........... G06Q 40/03
706/12
2023/0316232 A1 * 10/2023 Gordon .................. G06Q 40/12
705/322
2024/0193481 A1 * 6/2024 Bucklin ................. G06N 20/00

* cited by examiner

*Primary Examiner* — Gregory S Cunningham, II
(74) *Attorney, Agent, or Firm* — Leason Ellis LLP

(57) ABSTRACT

A system and method detect bias and to perform debiasing of an item including data, ideas, and processes, by determining a fairness ratio, from model scores from a recommendation model, sorting the model scores into an ordered list of scores, determining that a sorted score is within a range of predetermined upper and lower thresholds, adjusting the sorted score, recomputing the fairness ratio from the adjusted sorted score, and in the case that the recomputed fairness ratio is not within the range, further adjusting the sorted score until a corresponding fairness ratio of the adjusted sorted score is within the range. In the case that the recomputed fairness ratio is within the range, the system and method generate and output a message with the adjusted sorted score to a recommendation engine, which generates and outputs a recommendation based on the adjusted sorted score.

17 Claims, 22 Drawing Sheets

50

INPUT MARKETING IDEAS TAXONOMY — 52

INPUT CLIENT FEATURES — 54

SCORE MODEL USING MACHINE LEARNING ALGORITHM — 56

GENERATE RESPONSE MATRIX — 58

WEIGHT RESPONSE BY EXPECTED NAA — 60

APPLY ELIGIBILITY RULES — 62

DETECT BIAS OF IDEAS AND DEBIAS IDEAS, IF REQUIRED — 64

EXECUTE MARKETING CAMPAIGNS — 66

200

500

| ALGO ID | Description | HH Count (All Ranks) | HH Count (Top 4 Ranks) | A. % of HH (Top 4 Ranks) / (All Ranks) | HH (62+ yrs) Count (All Ranks) | HH (62+ yrs) Count (Top 4 Ranks) | B. % of HH (62+ yrs) (Top 4 Ranks) / (All Ranks) | Fairness Ratio (B/A) |
|---|---|---|---|---|---|---|---|---|
| ML0001A | Set up Recurring Deposits | 4,371,923 | 4,891 | 0.112% | 902,809 | 1,444 | 0.160% | 1.430 |
| ML0002A | Covr - Term Life Insurance | 4,371,923 | | | 902,809 | | | |
| ML0003A | Open an IRA Awareness | 4,371,923 | 1,034,340 | 23.659% | 902,809 | 181,779 | 20.135% | 0.851 |
| ML0003B | Open an IRA Incentive | 4,371,923 | 3,317,719 | 75.887% | 902,809 | 711,847 | 78.848% | 1.039 |
| ML0004B | Open Core Portfolios-Incentive | 4,371,923 | 23,937 | 0.548% | 902,809 | 5,742 | 0.636% | 1.162 |
| ML0005A | Refer a Friend | 4,371,923 | 902 | 0.021% | 902,809 | 408 | 0.045% | 2.190 |
| ML0007A | Set up AIP | 4,371,923 | | | 902,809 | | | |
| ML0008A | Retirement Content | 4,371,923 | 114 | 0.003% | 902,809 | 31 | 0.003% | 1.317 |
| ML0009A | Thematic Investing | 4,371,923 | | | 902,809 | | | |
| ML0010A | Drive Options Usage | 4,371,923 | 5,850 | 0.134% | 902,809 | 994 | 0.110% | 0.823 |
| ML0011A | PET Web | 4,371,923 | | | 902,809 | | | |
| ML0012A | Options Education | 4,371,923 | 5,936 | 0.136% | 902,809 | 975 | 0.108% | 0.795 |
| ML0013A | Enroll in Futures | 4,371,923 | 1 | 0.000% | 902,809 | | | |
| ML0015A | Tango- Digital | 4,371,923 | 4,371,921 | 100.000% | 902,809 | 902,809 | 100.000% | 1.000 |
| ML0017A | Consolidate Assets | 4,371,923 | 4,360,731 | 99.744% | 902,809 | 902,512 | 99.967% | 1.002 |
| ML0019A | Q2 Special Offer Offer | 4,371,923 | 4,360,677 | 99.743% | 902,809 | 902,532 | 99.969% | 1.002 |
| ML0020A | Earth Day | 4,371,923 | | | 902,809 | | | |
| ML0021A | Prebuilt | 4,371,923 | 1 | 0.000% | 902,809 | | | |
| ML0022A | Budgeting Content | 4,371,923 | 135 | 0.003% | 902,809 | 32 | 0.004% | 1.148 |
| ML0023A | MSAW Best of Content | 4,371,923 | 146 | 0.003% | 902,809 | 37 | 0.004% | 1.227 |
| ML0024A | Saving & Paying Off Debt Content | 4,371,923 | 131 | 0.003% | 902,809 | 32 | 0.004% | 1.183 |
| ML0025A | Market Outlook Content | 4,371,923 | 132 | 0.003% | 902,809 | 30 | 0.003% | 1.101 |
| ML0026A | Managing Your Portfolio Content | 4,371,923 | 128 | 0.003% | 902,809 | 32 | 0.004% | 1.211 |

FIG. 6

| Decile | Set up Recurring Deposits | Open an IRA - Awareness | Open an IRA - Incentive | Open Core Portfolios - Incentive | Refer a Friend | Drive Options Usage | Options Education | Tango - Digital | Consolidate Assets | Q2 Special Offer | Overall |
|---|---|---|---|---|---|---|---|---|---|---|---|
| 1 | 0.0174 | 0.0188 | 0.0227 | 0.0175 | 0.0109 | 0.0241 | 0.0241 | 0.0745 | 0.0733 | 0.0733 | 0.0621 |
| 2 | 0.0137 | 0.0146 | 0.0177 | 0.0127 | 0.0074 | 0.0165 | 0.0165 | 0.0633 | 0.0474 | 0.0474 | 0.0405 |
| 3 | 0.0115 | 0.0120 | 0.0149 | 0.0101 | 0.0052 | 0.0133 | 0.0133 | 0.0570 | 0.0355 | 0.0355 | 0.0258 |
| 4 | 0.0100 | 0.0101 | 0.0129 | 0.0085 | 0.0039 | 0.0115 | 0.0115 | 0.0523 | 0.0282 | 0.0282 | 0.0177 |
| 5 | 0.0088 | 0.0087 | 0.0113 | 0.0075 | 0.0032 | 0.0103 | 0.0103 | 0.0484 | 0.0227 | 0.0227 | 0.0133 |
| 6 | 0.0077 | 0.0077 | 0.0100 | 0.0067 | 0.0028 | 0.0093 | 0.0093 | 0.0447 | 0.0186 | 0.0186 | 0.0104 |
| 7 | 0.0067 | 0.0068 | 0.0089 | 0.0060 | 0.0025 | 0.0084 | 0.0084 | 0.0411 | 0.0155 | 0.0155 | 0.0083 |
| 8 | 0.0059 | 0.0060 | 0.0078 | 0.0054 | 0.0022 | 0.0076 | 0.0076 | 0.0372 | 0.0128 | 0.0128 | 0.0066 |
| 9 | 0.0050 | 0.0052 | 0.0067 | 0.0046 | 0.0018 | 0.0066 | 0.0066 | 0.0322 | 0.0101 | 0.0101 | 0.0047 |
| 10 | 0.0002 | 0.0004 | 0.0002 | 0.0006 | 0.0000 | 0.0011 | 0.0011 | 0.0033 | 0.0009 | 0.0009 | 0.0000 |

FIG. 7

| Decile | Drive Options Usage | Options Education | Tango - Digital | Consolidate Assets | Q2 Special Offer | Overall |
|--------|---------------------|-------------------|-----------------|--------------------|------------------|---------|
| 1 | 13.07 | 13.07 | 13.37 | 16.95 | 16.95 | 12.37 |
| 2 | 26.05 | 26.05 | 26.26 | 29.64 | 29.64 | 23.06 |
| 3 | 38.30 | 38.30 | 38.45 | 41.18 | 41.18 | 33.04 |
| 4 | 50.04 | 50.04 | 50.00 | 51.69 | 51.69 | 43.51 |
| 5 | 60.98 | 60.98 | 60.79 | 61.69 | 61.69 | 53.92 |
| 6 | 71.28 | 71.28 | 70.84 | 71.83 | 71.83 | 64.12 |
| 7 | 80.72 | 80.72 | 80.10 | 81.57 | 81.57 | 73.91 |
| 8 | 89.19 | 89.19 | 88.59 | 90.29 | 90.29 | 83.13 |
| 9 | 96.11 | 96.11 | 95.84 | 97.06 | 97.06 | 91.95 |
| 10 | 100.00 | 100.00 | 100.00 | 100.00 | 100.00 | 100.00 |

FIG. 8

| Decile | Drive Options Usage | Options Education | Tango - Digital | Consolidate Assets | Q2 Special Offer | Overall |
|---|---|---|---|---|---|---|
| 1 | 9.19 | 9.19 | 9.11 | 8.19 | 8.19 | 9.38 |
| 2 | 18.40 | 18.40 | 18.35 | 17.48 | 17.48 | 19.19 |
| 3 | 27.81 | 27.81 | 27.78 | 27.07 | 27.07 | 29.20 |
| 4 | 37.36 | 37.36 | 37.39 | 36.94 | 36.94 | 39.07 |
| 5 | 47.04 | 47.04 | 47.15 | 46.94 | 46.94 | 48.95 |
| 6 | 56.94 | 56.94 | 57.15 | 56.89 | 56.89 | 58.92 |
| 7 | 67.15 | 67.15 | 67.34 | 66.96 | 66.96 | 68.94 |
| 8 | 77.57 | 77.57 | 77.75 | 77.31 | 77.31 | 79.13 |
| 9 | 88.37 | 88.37 | 88.46 | 88.13 | 88.13 | 89.45 |
| 10 | 100.00 | 100.00 | 100.00 | 100.00 | 100.00 | 100.00 |

FIG. 9

| Percentile | Set up Recurring Deposits | Open an IRA - Awareness | Open an IRA - Incentive | Open Core Portfolios - Incentive | Refer a Friend | Drive Options Usage | Options Education | Tango - Digital | Consolidate Assets | Q2 Special Offer | Overall |
|---|---|---|---|---|---|---|---|---|---|---|---|
| 1 | 0.0324 | 0.0352 | 0.0425 | 0.0475 | 0.0230 | 0.1654 | 0.1654 | 0.1249 | 0.1767 | 0.1767 | 0.1414 |
| 2 | 0.0273 | 0.0296 | 0.0358 | 0.0318 | 0.0191 | 0.0850 | 0.0850 | 0.1085 | 0.1433 | 0.1433 | 0.1111 |
| 3 | 0.0245 | 0.0267 | 0.0323 | 0.0271 | 0.0170 | 0.0593 | 0.0593 | 0.0986 | 0.1248 | 0.1248 | 0.0963 |
| 4 | 0.0227 | 0.0247 | 0.0299 | 0.0244 | 0.0155 | 0.0459 | 0.0459 | 0.0921 | 0.1120 | 0.1120 | 0.0871 |
| 5 | 0.0214 | 0.0232 | 0.0281 | 0.0226 | 0.0144 | 0.0382 | 0.0382 | 0.0873 | 0.1023 | 0.1023 | 0.0807 |
| 6 | 0.0203 | 0.0220 | 0.0266 | 0.0212 | 0.0135 | 0.0333 | 0.0333 | 0.0837 | 0.0944 | 0.0944 | 0.0757 |
| 7 | 0.0194 | 0.0210 | 0.0254 | 0.0201 | 0.0127 | 0.0300 | 0.0300 | 0.0808 | 0.0879 | 0.0879 | 0.0716 |
| 8 | 0.0187 | 0.0202 | 0.0244 | 0.0191 | 0.0120 | 0.0276 | 0.0276 | 0.0784 | 0.0824 | 0.0824 | 0.0681 |
| 9 | 0.0180 | 0.0195 | 0.0235 | 0.0183 | 0.0114 | 0.0257 | 0.0257 | 0.0763 | 0.0775 | 0.0775 | 0.0650 |
| 10 | 0.0174 | 0.0188 | 0.0227 | 0.0175 | 0.0109 | 0.0241 | 0.0241 | 0.0745 | 0.0733 | 0.0733 | 0.0621 |

FIG. 10

| Percentile | Households | Min Score | Max Score | Cum. Perc HH |
|---|---|---|---|---|
| 1 | 9,461 | 0.1654 | 0.6623 | 1.05 |
| 2 | 12,160 | 0.0850 | 0.1653 | 2.39 |
| 3 | 11,577 | 0.0593 | 0.0850 | 3.68 |
| 4 | 11,657 | 0.0459 | 0.0593 | 4.97 |
| 5 | 12,228 | 0.0382 | 0.0458 | 6.32 |
| 6 | 12,207 | 0.0333 | 0.0381 | 7.67 |
| 7 | 12,470 | 0.0300 | 0.0333 | 9.06 |
| 8 | 12,146 | 0.0276 | 0.0300 | 10.40 |
| 9 | 12,053 | 0.0257 | 0.0276 | 11.74 |
| 10 | 12,005 | 0.0241 | 0.0256 | 13.07 |

FIG. 11

| Percentile | Drive Options Usage | Options Education | Tango - Digital | Consolidate Assets | Q2 Special Offer | Overall |
|---|---|---|---|---|---|---|
| 1 | 1.05 | 1.05 | 1.33 | 2.30 | 2.30 | 1.37 |
| 2 | 2.39 | 2.39 | 2.59 | 4.30 | 4.30 | 2.75 |
| 3 | 3.68 | 3.68 | 3.91 | 6.13 | 6.13 | 4.04 |
| 4 | 4.97 | 4.97 | 5.27 | 7.87 | 7.87 | 5.28 |
| 5 | 6.32 | 6.32 | 6.63 | 9.52 | 9.52 | 6.50 |
| 6 | 7.67 | 7.67 | 7.99 | 11.10 | 11.10 | 7.70 |
| 7 | 9.06 | 9.06 | 9.33 | 12.62 | 12.62 | 8.89 |
| 8 | 10.40 | 10.40 | 10.70 | 14.10 | 14.10 | 10.06 |
| 9 | 11.74 | 11.74 | 12.04 | 15.55 | 15.55 | 11.21 |
| 10 | 13.07 | 13.07 | 13.37 | 16.95 | 16.95 | 12.37 |

FIG. 12

| Percentile | Drive Options Usage | Options Education | Tango - Digital | Consolidate Assets | Q2 Special Offer | Overall |
|---|---|---|---|---|---|---|
| 1 | 0.99 | 0.99 | 0.91 | 0.66 | 0.66 | 0.90 |
| 2 | 1.90 | 1.90 | 1.84 | 1.40 | 1.40 | 1.80 |
| 3 | 2.82 | 2.82 | 2.76 | 2.18 | 2.18 | 2.73 |
| 4 | 3.74 | 3.74 | 3.66 | 2.99 | 2.99 | 3.66 |
| 5 | 4.65 | 4.65 | 4.57 | 3.82 | 3.82 | 4.61 |
| 6 | 5.56 | 5.56 | 5.48 | 4.67 | 4.67 | 5.55 |
| 7 | 6.46 | 6.46 | 6.38 | 5.53 | 5.53 | 6.50 |
| 8 | 7.36 | 7.36 | 7.29 | 6.41 | 6.41 | 7.46 |
| 9 | 8.28 | 8.28 | 8.20 | 7.29 | 7.29 | 8.42 |
| 10 | 9.19 | 9.19 | 9.11 | 8.19 | 8.19 | 9.38 |

FIG. 13

| ALGO ID | DESCRIPTION | Feb File | | | 1st Percentile Score Increments | | | 2nd Percentile Score Increments | | |
|---|---|---|---|---|---|---|---|---|---|---|
| | | HOUSEHOLD COUNT TOP 4 RANKS | % | FAIRNESS RATIO | HH COUNT TOP 4 RANKS-%DIFF | FAIRNESS RATIO | FAIRNESS RATIO-DIFF | %DIFF | FAIRNESS RATIO | RATIO-DIFF |
| ML0001A | Set up Recurring Deposits | 4891 | 0.028% | 1.430 | 0.000% | 1.430 | 0.000 | 0.000% | 1.430 | 0.000 |
| ML0002A | Covr-Term Life Insurance | 0 | 0.000% | 0.000 | 0.000% | 0.000 | 0.000 | 0.000% | 0.000 | 0.000 |
| ML0003A | Open an IRA Awareness | 1034340 | 5.915% | 0.851 | -0.012% | 0.843 | -0.008 | -0.001% | 0.851 | 0.000 |
| ML0003B | Open an IRA Incentive | 3317719 | 18.972% | 1.039 | -0.011% | 1.037 | -0.002 | 0.000% | 1.039 | 0.000 |
| ML0004B | Open Core Portfolios Incentive | 23937 | 0.137% | 1.162 | 0.000% | 1.162 | 0.000 | 0.000% | 1.162 | 0.000 |
| ML0005A | Refer a Friend | 902 | 0.005% | 2.190 | 0.000% | 2.187 | -0.003 | 0.000% | 2.190 | 0.000 |
| ML0007A | Set up AIP | 0 | 0.000% | 0.000 | 0.000% | 0.000 | 0.000 | 0.000% | 0.000 | 0.000 |
| ML0008A | Retirement Content | 114 | 0.001% | 1.317 | 0.000% | 1.317 | 0.000 | 0.000% | 1.086 | -0.231 |
| ML0009A | Thematic Investing | 0 | 0.000% | 0.000 | 0.000% | 0.000 | 0.000 | 0.000% | 0.000 | 0.000 |
| ML0010A | Drive Options Usage | 5850 | 0.033% | 0.823 | -0.004% | 0.260 | -0.562 | 0.000% | 0.800 | -0.023 |
| ML0011A | PET Web | 0 | 0.000% | 0.000 | 0.000% | 0.000 | 0.000 | 0.000% | 0.000 | 0.000 |
| ML0012A | Options Education | 5936 | 0.034% | 0.795 | 0.027% | 2.581 | 1.785 | 0.001% | 0.955 | 0.160 |
| ML0013A | Enroll in Futures | 1 | 0.000% | 0.000 | 0.000% | 0.000 | 0.000 | 0.000% | 0.000 | 0.000 |
| ML0015A | Tango-Digital | 4371921 | 25.000% | 1.000 | 0.000% | 1.000 | 0.000 | 0.000% | 1.000 | 0.000 |
| ML0017A | Consolidate Assets | 4360731 | 24.936% | 1.002 | 0.000% | 1.002 | 0.000 | 0.000% | 1.002 | 0.000 |
| ML0019A | Q2 Special Offer Offer | 4360677 | 24.936% | 1.002 | 0.000% | 1.002 | 0.000 | 0.000% | 1.002 | 0.000 |
| ML0020A | Earth Day | 0 | 0.000% | 0.000 | 0.000% | 0.000 | 0.000 | 0.000% | 0.000 | 0.000 |
| ML0021A | Prebuilt | 1 | 0.000% | 0.000 | 0.000% | 0.000 | 0.000 | 0.000% | 0.000 | 0.000 |
| ML0022A | Budgeting Content | 135 | 0.001% | 1.148 | 0.000% | 1.120 | -0.028 | 0.000% | 0.976 | -0.172 |
| ML0023A | MSAW Best of Content | 146 | 0.001% | 1.227 | 0.000% | 1.227 | 0.000 | 0.000% | 0.903 | -0.324 |
| ML0024A | Saving & Paying Off Debt Content | 131 | 0.001% | 1.183 | 0.000% | 1.183 | 0.000 | 0.000% | 1.097 | -0.086 |
| ML0025A | Market Outlook Content | 132 | 0.001% | 1.101 | 0.000% | 1.101 | 0.000 | 0.000% | 0.827 | -0.274 |
| ML0026A | Managing Your Portfolio Content | 128 | 0.001% | 1.211 | 0.000% | 1.182 | -0.029 | 0.000% | 0.969 | -0.242 |

% Overall Diff 0.054%    % Overall Diff 0.003%

FIG. 14

| ALGO ID | DESCRIPTION | Feb File | | | 3rd Percentile Score Increments | | | 4rth Percentile Score Increments | | |
|---|---|---|---|---|---|---|---|---|---|---|
| | | HOUSEHOLD COUNT TOP 4 RANKS | % | FAIRNESS RATIO | HH COUNT TOP 4 RANKS-%DIFF | FAIRNESS RATIO | FAIRNESS RATIO-DIFF | HH COUNT TOP 4 RANKS-%DIFF | FAIRNESS RATIO | FAIRNESS RATIO-DIFF |
| ML0001A | Set up Recurring Deposits | 4891 | 0.028% | 1.430 | 0.00000% | 1.430 | 0.000 | 0.00000% | 1.430 | 0.000 |
| ML0002A | Covr-Term Life Insurance | 0 | 0.000% | 0.000 | 0.00000% | 0.000 | 0.000 | 0.00000% | 0.000 | 0.000 |
| ML0003A | Open an IRA Awareness | 1034340 | 5.915% | 0.851 | -0.00001% | 0.851 | 0.000 | -0.00001% | 0.851 | 0.000 |
| ML0003B | Open an IRA incentive | 3317719 | 18.972% | 1.039 | -0.00001% | 1.039 | 0.000 | 0.00000% | 1.039 | 0.000 |
| ML0004B | Open Core Portfolios-Incentive | 23937 | 0.137% | 1.162 | 0.00000% | 1.162 | 0.000 | 0.00000% | 1.162 | 0.000 |
| ML0005A | Refer a Friend | 902 | 0.005% | 2.190 | 0.00000% | 2.190 | 0.000 | 0.00000% | 2.190 | 0.000 |
| ML0007A | Set up AIP | 0 | 0.000% | 0.000 | 0.00000% | 0.000 | 0.000 | 0.00000% | 0.000 | 0.000 |
| ML0008A | Retirement Content | 114 | 0.001% | 1.317 | -0.00001% | 1.286 | -0.031 | 0.00000% | 1.317 | 0.000 |
| ML0009A | Thematic Investing | 0 | 0.000% | 0.000 | 0.00000% | 0.000 | 0.000 | 0.00000% | 0.000 | 0.000 |
| ML0010A | Drive Options Usage | 5850 | 0.033% | 0.823 | -0.00001% | 0.821 | -0.001 | -0.00001% | 0.822 | -0.001 |
| ML0011A | PET Web | 0 | 0.000% | 0.000 | 0.00000% | 0.000 | 0.000 | 0.00000% | 0.000 | 0.000 |
| ML0012A | Options Education | 5936 | 0.034% | 0.795 | 0.00005% | 0.801 | 0.005 | 0.00002% | 0.797 | 0.002 |
| ML0013A | Enroll in Futures | 1 | 0.000% | 0.000 | 0.00000% | 0.000 | 0.000 | 0.00000% | 0.000 | 0.000 |
| ML0015A | Tango-Digital | 4371921 | 25.000% | 1.000 | 0.00000% | 1.000 | 0.000 | 0.00000% | 1.000 | 0.000 |
| ML0017A | Consolidate Assets | 4360731 | 24.936% | 1.002 | 0.00000% | 1.002 | 0.000 | 0.00000% | 1.002 | 0.000 |
| ML0019A | Q2 Special Offer Offer | 4360677 | 24.936% | 1.002 | 0.00000% | 1.002 | 0.000 | 0.00000% | 1.002 | 0.000 |
| ML0020A | Earth Day | 0 | 0.000% | 0.000 | 0.00000% | 0.000 | 0.000 | 0.00000% | 0.000 | 0.000 |
| ML0021A | Prebuilt | 1 | 0.000% | 0.000 | 0.00000% | 0.000 | 0.000 | 0.00000% | 0.000 | 0.000 |
| ML0022A | Budgeting Content | 135 | 0.001% | 1.148 | -0.00001% | 1.120 | -0.028 | 0.00000% | 1.148 | 0.000 |
| ML0023A | MSAW Best of Content | 146 | 0.001% | 1.227 | 0.00000% | 1.227 | 0.000 | 0.00000% | 1.227 | 0.000 |
| ML0024A | Saving & Paying Off Debt Content | 131 | 0.001% | 1.183 | -0.00001% | 1.126 | -0.057 | 0.00000% | 1.183 | 0.000 |
| ML0025A | Market Outlook Content | 132 | 0.001% | 1.101 | 0.00000% | 1.101 | 0.000 | -0.00001% | 1.072 | -0.029 |
| ML0026A | Managing Your Portfolio Content | 128 | 0.001% | 1.211 | 0.00000% | 1.211 | 0.000 | 0.00000% | 1.211 | 0.000 |
| | | | | | % Overall Diff | 0.00009% | | % Overall Diff | 0.000003% | |

FIG. 15

| ALGO ID | Description | HH Count (All Ranks) | HH Count (Top 4 Ranks) | A. % of HH (Top 4 Ranks) / (All Ranks) | HH (62+ yrs) Count (All Ranks) | HH (62+ yrs) Count (Top 4 Ranks) | B. % of HH (62+ yrs) (Top 4 Ranks) / (All Ranks) | Fairness Ratio (B/A) |
|---|---|---|---|---|---|---|---|---|
| ML0001A | Set up Recurring Deposits | 4,655,528 | 166,837 | 3.58% | 907,853 | 15,790 | 1.74% | 0.485 |
| ML0002A | Covr Term Life Insurance | 4,655,528 | 3,072,775 | 66.00% | 907,853 | 643,577 | 70.89% | 1.074 |
| ML0003A | Open an IRA Awareness | 4,655,528 | 899,914 | 19.33% | 907,853 | 171,287 | 18.87% | 0.976 |
| ML0003B | Open an IRA Incentive | 4,655,528 | 4,062,060 | 87.25% | 907,853 | 761,287 | 83.86% | 0.961 |
| ML0004A | Open Core Portfolio | 4,655,528 | 1,750 | 0.04% | 907,853 | 158 | 0.02% | 0.463 |
| ML0005A | Refer a Friend | 4,655,528 | 1,108 | 0.02% | 907,853 | 43 | 0.00% | 0.199 |
| ML0006A | Open a Brokerage Incentive | 4,655,528 | 742,495 | 15.95% | 907,853 | 141,643 | 15.60% | 0.978 |
| ML0007A | Set up AIP | 4,655,528 | 91 | 0.00% | 907,853 | | | |
| ML0008A | Retirement Content | 4,655,528 | 219,303 | 4.71% | 907,853 | 59,525 | 6.56% | 1.392 |
| ML0009A | Thematic Investing | 4,655,528 | | | 907,853 | | | |
| ML0010A | Drive Options Usage | 4,655,528 | 80,884 | 1.74% | 907,853 | 12,604 | 1.39% | 0.799 |
| ML0011A | PET Web | 4,655,528 | | | 907,853 | | | |
| ML0012A | Options Education | 4,655,528 | 81,021 | 1.74% | 907,853 | 12,602 | 1.39% | 0.798 |
| ML0013A | Futures Enrollment | 4,655,528 | | | 907,853 | | | |
| ML0015A | Tango Digital | 4,655,528 | 4,655,528 | 100.00% | 907,853 | 907,853 | 100.00% | 1.000 |
| ML0017A | Consolidate Assets | 4,655,528 | 4,638,346 | 99.63% | 907,853 | 905,043 | 99.69% | 1.001 |

FIG. 16

| Decile | Set up Recurring Deposits | Covr Term Life Insurance | Open an IRA Awareness | Open an IRA Incentive | Open Core Portfolio | Refer a Friend | Open a Brokerage Incentive | Set up AIP | Retirement Content | Drive Options Usage | Options Education | Tango Digital | Consolidate Assets | Overall |
|---|---|---|---|---|---|---|---|---|---|---|---|---|---|---|
| 1 | 0.0161 | 0.0876 | 0.0147 | 0.0223 | 0.0102 | 0.0085 | 0.0130 | 0.0074 | 0.0383 | 0.0225 | 0.0225 | 0.1004 | 0.0674 | 0.0448 |
| 2 | 0.0104 | 0.0704 | 0.0099 | 0.0173 | 0.0067 | 0.0060 | 0.0092 | 0.0048 | 0.0286 | 0.0148 | 0.0148 | 0.0813 | 0.0499 | 0.0238 |
| 3 | 0.0080 | 0.0604 | 0.0076 | 0.0141 | 0.0052 | 0.0045 | 0.0070 | 0.0037 | 0.0239 | 0.0114 | 0.0114 | 0.0698 | 0.0416 | 0.0147 |
| 4 | 0.0067 | 0.0528 | 0.0063 | 0.0118 | 0.0043 | 0.0036 | 0.0056 | 0.0030 | 0.0207 | 0.0095 | 0.0095 | 0.0609 | 0.0352 | 0.0097 |
| 5 | 0.0057 | 0.0464 | 0.0055 | 0.0101 | 0.0037 | 0.0030 | 0.0045 | 0.0025 | 0.0184 | 0.0083 | 0.0083 | 0.0532 | 0.0306 | 0.0071 |
| 6 | 0.0049 | 0.0404 | 0.0049 | 0.0088 | 0.0032 | 0.0026 | 0.0037 | 0.0022 | 0.0164 | 0.0074 | 0.0074 | 0.0461 | 0.0269 | 0.0055 |
| 7 | 0.0043 | 0.0347 | 0.0044 | 0.0078 | 0.0029 | 0.0023 | 0.0032 | 0.0019 | 0.0145 | 0.0066 | 0.0066 | 0.0392 | 0.0235 | 0.0042 |
| 8 | 0.0037 | 0.0290 | 0.0039 | 0.0068 | 0.0026 | 0.0020 | 0.0028 | 0.0017 | 0.0125 | 0.0058 | 0.0058 | 0.0322 | 0.0203 | 0.0032 |
| 9 | 0.0031 | 0.0226 | 0.0034 | 0.0058 | 0.0022 | 0.0017 | 0.0024 | 0.0014 | 0.0103 | 0.0050 | 0.0050 | 0.0244 | 0.0167 | 0.0024 |
| 10 | 0.0003 | 0.0009 | 0.0008 | 0.0017 | 0.0004 | 0.0002 | 0.0007 | 0.0002 | 0.0013 | 0.0007 | 0.0007 | 0.0008 | 0.0017 | 0.0002 |

FIG. 17

| | 1st Percentile | 2nd Percentile | 3rd Percentile | 4th Percentile | 5th Percentile | Fairness Ratio-Old | Fairness Ratio-New |
|---|---|---|---|---|---|---|---|
| Drive Options Usage | Incremented closer to upper bound of 1st Perc | | | | | 0.799 | 0.957 |
| Options Education | Incremented closer to upper bound of 1st Perc | | | | | 0.798 | 0.952 |
| Setup Recurring Deposits | | Incremented closer to upper bound of 1st Perc | | | | 0.485 | 0.904 |
| Open Core Portfolio | | | Incremented closer to upper bound of 2nd Perc | | | 0.463 | 0.924 |
| Refer a Friend | | | Incremented closer to upper bound of 2nd Perc | | | 0.199 | 0.855 |
| Setup AIP | | | | | | 0.000 | 1.004 |

FIG. 18

| ALGO ID | ALGO DESCRIPTION | Oct File | | | Debias Drive Options Usage | | | Debias Options Education | | |
|---|---|---|---|---|---|---|---|---|---|---|
| | | HOUSEHOLD COUNT TOP 4 RANKS | % | FAIRNESS RATIO | HH COUNT TOP 4 RANKS -%DIFF | FAIRNESS RATIO | FAIRNESS RATIO-DIFF | HH COUNT TOP 4 RANKS -%DIFF | FAIRNESS RATIO | FAIRNESS RATIO-DIFF |
| ML0001A | Idea 1-Set up Recurring Deposits | 166837 | 0.896% | 0.485 | 0.000% | 0.488 | 0.003 | 0.000% | 0.488 | 0.003 |
| ML0002A | Idea 2-Covr Term Life Insurance | 3072775 | 16.501% | 1.074 | -0.001% | 1.074 | 0.000 | -0.005% | 1.073 | -0.001 |
| ML0003A | Idea 4A-Open an IRA Awareness | 899914 | 4.833% | 0.976 | -0.004% | 0.972 | -0.004 | -0.008% | 0.969 | -0.007 |
| ML0003B | Idea 4B-Open an IRA Incentive | 4062060 | 21.813% | 0.961 | -0.005% | 0.961 | 0.000 | -0.007% | 0.960 | -0.001 |
| ML0004A | Idea 5-Open Core Portfolio | 1750 | 0.009% | 0.463 | 0.000% | 0.456 | -0.007 | 0.000% | 0.456 | -0.007 |
| ML0005A | Idea 6-Refer a Friend | 1108 | 0.006% | 0.199 | 0.000% | 0.158 | -0.041 | 0.000% | 0.158 | -0.041 |
| ML0006A | Idea 7B-Open a Brokerage Incentive | 742495 | 3.987% | 0.978 | -0.003% | 0.973 | -0.005 | -0.010% | 0.966 | -0.012 |
| ML0007A | Idea 8-Set up AIP | 91 | 0.000% | 0.000 | 0.000% | 0.000 | 0.000 | 0.000% | 0.000 | 0.000 |
| ML0008A | Idea 9-Retirement Content | 219303 | 1.178% | 1.392 | 0.000% | 1.390 | -0.002 | 0.000% | 1.390 | -0.002 |
| ML0009A | Idea 10-Thematic Investing | 0 | 0.000% | 0.000 | 0.000% | 0.000 | 0.000 | 0.000% | 0.000 | 0.000 |
| ML0010A | Idea 11-Drive Options Usage | 80884 | 0.434% | 0.799 | 0.017% | 0.957 | 0.158 | 0.017% | 0.953 | 0.154 |
| ML0011A | Idea 12-PET Web | 0 | 0.000% | 0.000 | 0.000% | 0.000 | 0.000 | 0.000% | 0.000 | 0.000 |
| ML0012A | Idea 13-Options Education | 81021 | 0.435% | 0.798 | -0.003% | 0.771 | -0.027 | 0.017% | 0.952 | 0.154 |
| ML0013A | Idea 14-Futures Enrollment | 0 | 0.000% | 0.000 | 0.000% | 0.000 | 0.000 | 0.000% | 0.000 | 0.000 |
| ML0015A | Idea 16A-Tango Digital | 4655528 | 25.000% | 1.000 | 0.000% | 1.000 | 0.000 | 0.000% | 1.000 | 0.000 |
| ML0017A | Idea 19-Consolidate Assets | 4638346 | 24.908% | 1.001 | 0.000% | 1.001 | 0.000 | -0.003% | 1.000 | 0.000 |
| | | | | | % Overall Diff | 0.034% | | % Overall Diff | 0.067% | |

FIG. 19

| ALGO ID | ALGO DESCRIPTION | Oct File | | | Debias Setup Recurring Deposits | | | Debias Core Portfolio | | |
|---|---|---|---|---|---|---|---|---|---|---|
| | | HOUSEHOLD COUNT TOP 4 RANKS | % | FAIRNESS RATIO | HH COUNT TOP 4 RANKS-%DIFF | FAIRNESS RATIO | FAIRNESS RATIO-DIFF | HH COUNT TOP 4 RANKS-%DIFF | FAIRNESS RATIO | FAIRNESS RATIO-DIFF |
| ML0001A | Idea 1-Set up Recurring Deposits | 166837 | 0.896% | 0.485 | 0.091% | 0.904 | 0.419 | 0.091% | 0.903 | 0.091% |
| ML0002A | Idea 2-Covr Term Life Insurance | 3072775 | 16.501% | 1.074 | -0.008% | 1.072 | -0.002 | -0.008% | 1.072 | -0.008% |
| ML0003A | Idea 4A-Open an IRA Awareness | 899914 | 4.833% | 0.976 | -0.048% | 0.935 | -0.041 | -0.049% | 0.935 | -0.048% |
| ML0003B | Idea 4B-Open an IRA Incentive | 4062060 | 21.813% | 0.961 | -0.031% | 0.956 | -0.005 | -0.031% | 0.956 | -0.031% |
| ML0004A | Idea 5-Open Core Portfolio | 1750 | 0.009% | 0.463 | 0.000% | 0.445 | -0.018 | 0.001% | 0.924 | 0.000% |
| ML0005A | Idea 6-Refer a Friend | 1108 | 0.006% | 0.199 | 0.000% | 0.145 | -0.054 | 0.000% | 0.145 | 0.000% |
| ML0006A | Idea 7B-Open a Brokerage Incentive | 742495 | 3.987% | 0.978 | -0.028% | 0.949 | -0.030 | -0.028% | 0.949 | -0.028% |
| ML0007A | Idea 8-Set up AIP | 91 | 0.000% | 0.000 | 0.000% | 0.000 | 0.000 | 0.000% | 0.000 | 0.000% |
| ML0008A | Idea 9-Retirement Content | 219303 | 1.178% | 1.392 | -0.002% | 1.385 | -0.007 | -0.002% | 1.385 | -0.002% |
| ML0009A | Idea 10-Thematic Investing | 0 | 0.000% | 0.000 | 0.000% | 0.000 | 0.000 | 0.000% | 0.000 | 0.000% |
| ML0010A | Idea 11-Drive Options Usage | 80884 | 0.434% | 0.799 | 0.015% | 0.941 | 0.142 | 0.015% | 0.941 | 0.015% |
| ML0011A | Idea 12-PET Web | 0 | 0.000% | 0.000 | 0.000% | 0.000 | 0.000 | 0.000% | 0.000 | 0.000% |
| ML0012A | Idea 13-Options Education | 81021 | 0.435% | 0.798 | 0.015% | 0.939 | 0.141 | 0.015% | 0.939 | 0.015% |
| ML0013A | Idea 14-Futures Enrollment | 0 | 0.000% | 0.000 | 0.000% | 0.000 | 0.000 | 0.000% | 0.000 | 0.000% |
| ML0015A | Idea 16A-Tango Digital | 4655528 | 25.000% | 1.000 | 0.000% | 1.000 | 0.000 | 0.000% | 1.000 | 0.000% |
| ML0017A | Idea 19-Consolidate Assets | 4638346 | 24.908% | 1.001 | -0.005% | 1.000 | -0.001 | -0.005% | 1.000 | -0.005% |
| | | | | | % Overall Diff 0.244% | | | % Overall Diff 0.245% | | |

FIG. 20

| ALGO_ID | ALGO DESCRIPTION | Oct File | | | Debias Refer a Friend | | | Debias Setup AIP | | |
|---|---|---|---|---|---|---|---|---|---|---|
| | | HOUSEHOLD COUNT TOP 4 RANKS | % | FAIRNESS RATIO | HH COUNT TOP 4 RANKS- %DIFF | FAIRNESS RATIO | FAIRNESS RATIO-DIFF | HH COUNT TOP 4 RANKS- %DIFF | FAIRNESS RATIO | FAIRNESS RATIO-DIFF |
| ML0001A | Idea 1- Set up Recurring Deposits | 166837 | 0.896% | 0.485 | 0.091% | 0.903 | 0.418 | | | |
| ML0002A | Idea 2- Covr Term Life Insurance | 3072775 | 16.501% | 1.074 | -0.008% | 1.072 | -0.002 | | | |
| ML0003A | Idea 4A- Open an IRA Awareness | 899914 | 4.833% | 0.976 | -0.049% | 0.934 | -0.042 | | | |
| ML0003B | Idea 4B- Open an IRA Incentive | 4062060 | 21.813% | 0.961 | -0.031% | 0.956 | -0.005 | | | |
| ML0004A | Idea 5- Open Core Portfolio | 1750 | 0.009% | 0.463 | 0.001% | 0.924 | 0.461 | | | |
| ML0005A | Idea 6- Refer a Friend | 1108 | 0.006% | 0.199 | 0.001% | 0.855 | 0.656 | | | |
| ML0006A | Idea 7B-Open a Brokerage Incentive | 742495 | 3.987% | 0.978 | -0.028% | 0.948 | -0.030 | | | |
| ML0007A | Idea 8- Set up AIP | 91 | 0.000% | 0.000 | 0.000% | 0.000 | 0.000 | | | |
| ML0008A | Idea 9- Retirement Content | 219303 | 1.178% | 1.392 | -0.002% | 1.385 | -0.007 | | | |
| ML0009A | Idea 10- Thematic Investing | 0 | 0.000% | 0.000 | 0.000% | 0.000 | 0.000 | | | |
| ML0010A | Idea 11- Drive Options Usage | 80884 | 0.434% | 0.799 | 0.015% | 0.941 | 0.142 | | | |
| ML0011A | Idea 12- PET Web | 0 | 0.000% | 0.000 | 0.000% | 0.000 | 0.000 | | | |
| ML0012A | Idea 13- Options Education | 81021 | 0.435% | 0.798 | 0.015% | 0.939 | 0.141 | | | |
| ML0013A | Idea 14- Futures Enrollment | 0 | 0.000% | 0.000 | 0.000% | 0.000 | 0.000 | | | |
| ML0015A | Idea 16A- Tango Digital | 4655528 | 25.000% | 1.000 | 0.000% | 1.000 | 0.000 | | | |
| ML0017A | Idea 19- Consolidate Assets | 4638346 | 24.908% | 1.001 | -0.005% | 1.000 | -0.001 | | | |

% Overall Diff    0.247%

FIG. 21

| ALGO_ID | ALGO DESCRIPTION | Oct File | | | Debias Refer a Friend | | | Debias Setup | | |
|---|---|---|---|---|---|---|---|---|---|---|
| | | HOUSEHOLD COUNT TOP 4 RANKS | % | FAIRNESS RATIO | HH COUNT TOP 4 RANKS-%DIFF | FAIRNESS RATIO | FAIRNESS RATIO-DIFF | HH COUNT TOP 4 RANKS-%DIFF | FAIRNESS RATIO | FAIRNESS RATIO-DIFF |
| ML0001A | Idea 1-Set up Recurring Deposits | 166837 | 0.90% | 0.485 | 0.091% | 0.903 | 0.418 | 0.091% | 0.903 | 0.418 |
| ML0002A | Idea 2-Covr Term Life Insurance | 3072775 | 16.50% | 1.074 | -0.008% | 1.072 | -0.002 | -0.008% | 1.072 | -0.002 |
| ML0003A | Idea 4A-Open an IRA Awareness | 899914 | 4.83% | 0.976 | -0.049% | 0.934 | -0.042 | -0.049% | 0.934 | -0.042 |
| ML0003B | Idea 4B-Open an IRA Incentive | 4062060 | 21.81% | 0.961 | -0.031% | 0.956 | -0.005 | -0.031% | 0.956 | -0.005 |
| ML0004A | Idea 5-Open Core Portfolio | 1750 | 0.01% | 0.463 | 0.001% | 0.924 | 0.461 | 0.001% | 0.924 | 0.461 |
| ML0005A | Idea 6-Refer a Friend | 1108 | 0.01% | 0.199 | 0.001% | 0.855 | 0.656 | 0.001% | 0.855 | 0.656 |
| ML0006A | Idea 7B-Open a Brokerage Incentive | 742495 | 3.99% | 0.978 | -0.028% | 0.948 | -0.03 | -0.028% | 0.948 | -0.030 |
| ML0007A | Idea 8-Set up AIP | 91 | 0.00% | 0 | 0.000% | 0 | 0 | 0.000% | 1.004 | 1.004 |
| ML0008A | Idea 9-Retirement Content | 219303 | 1.18% | 1.392 | -0.002% | 1.385 | -0.007 | -0.002% | 1.385 | -0.007 |
| ML0009A | Idea 10-Thematic Investing | 0 | 0.00% | 0 | 0.000% | 0 | 0 | 0.000% | 0.000 | 0.000 |
| ML0010A | Idea 11-Drive Options Options Usage | 80884 | 0.43% | 0.799 | 0.015% | 0.941 | 0.142 | 0.015% | 0.941 | 0.142 |
| ML0011A | Idea 12-PET Web | 0 | 0.00% | 0 | 0.000% | 0 | 0 | 0.000% | 0.000 | 0.000 |
| ML0012A | Idea 13-Options Education | 81021 | 0.44% | 0.798 | 0.015% | 0.939 | 0.141 | 0.015% | 0.939 | 0.141 |
| ML0013A | Idea 14-Futures Enrollment | 0 | 0.00% | 0 | 0.000% | 0 | 0 | 0.000% | 0.000 | 0.000 |
| ML0015A | Idea 16A-Tango Digital | 4655528 | 25.00% | 1 | 0.000% | 1 | 0 | 0.000% | 1.000 | 0.000 |
| ML0017A | Idea 19-Consolidate Assets | 4638346 | 24.91% | 1.001 | -0.005% | 1 | -0.001 | -0.005% | 1.000 | -0.001 |
| | | | | | % Overall Diff 0.247% | | | % Overall Diff 0.247% | | |

FIG. 22

SYSTEM AND METHOD FOR DETECTING BIAS AND PERFORMING DEBIASING

FIELD OF THE DISCLOSURE

The present disclosure relates generally to bias in data, ideas, and processes, and, more particularly, to a system and method configured to detect bias and to perform debiasing.

BACKGROUND OF THE DISCLOSURE

Algorithms are prevalent in many forms of data processing, such as recommendations of a model implemented by a recommendation engine. For example, a company such as AMAZON® or NETFLIX® can recommend choices of movies, purchases, and services to users. In addition, financial institutions such as banks can recommend financial instruments and financial choices to a user, such as investments, certificates of deposit (CDs), and interest rates of loans. Recommendation systems such as recommendation engines and recommendation algorithms play an integral role in the application of artificial intelligence (AI) in predictions and decision-making. While recommendation systems can reduce human subjectivity, such recommendation systems can also embed biases resulting in inaccurate or discriminatory predictions and outputs for certain subsets of a population. Harnessing the transformative potential of AI requires addressing such biases, which pose risks to businesses and the clients of such businesses.

In implementing algorithms, it is preferable to provide fair recommendations to users. Fairness is the absence of prejudice or favoritism towards an individual or group based on inherent characteristics or acquired characteristics of the individual or group. Accordingly, an unfair algorithm can make decisions or recommendations which are biased toward a particular group of people. Bias can be induced due to data, algorithms, or user experiences. Bias can exist for a single sensitive attribute of an item, or multiple sensitive attributes of an item. An item can include data, an idea, or a process.

Algorithmic bias occurs when bias is not present in the input data and is added purely by the algorithm. The algorithmic design choices, such as the use of certain optimization functions, regularizations, choices in applying regression models on the data as a whole or considering subgroups, and the general use of statistically biased estimators in algorithms, can all contribute to biased algorithmic decisions that can bias the outcome of the algorithms. While many forms of bias could exist in a model development framework, available debiasing techniques known in the prior art can address algorithmic bias. Algorithmic bias can be addressed in three different stages of model development. Pre-processing techniques attempt to transform the data so that any underlying discrimination is removed. In-processing techniques attempt to modify and change state-of-the-art learning algorithms to remove any discrimination during the model training process. Post-processing techniques are applied after training by accessing a holdout set which was not involved during the training of the model.

As shown in FIG. 1, bias testing 10 in a model lifecycle in the prior art can include data sourcing and pre-processing 12, model development including feature engineering 14, model testing and assessment 16, and model deployment and usage 18. Each step in the model lifecycle can address bias. For data sourcing and pre-processing 12, bias can be addressed by pre-processing 20 to detect bias in data. For model development including feature engineering 14, bias can be addressed by in-processing 22 to detect bias in features and algorithms. For model testing and assessment 16, bias can be addressed by post-processing 24 to detect bias detection in model results. For model deployment and usage 18, bias can be addressed by detecting bias detection in new data and model drift.

FIG. 2 is a method 50 illustrating model deployment and usage in the prior art, which includes inputting 52 marketing an ideas taxonomy and inputting 54 client features to a score model 56 using a machine learning (ML) algorithm. A response matrix is generated 56, and a weight response is determined 60 by an expected no-abstract-available (NAA) bias method. The method 50 further includes applying 62 eligibility rules, detecting 64 bias of ideas and debiasing the ideas, if required, and then executing 66 marketing campaigns. Such debiasing of ideas in step 64 as performed in the prior art are designed for binary choice models. Biasing in a binary choice model is measured for the recommendation of a single item. For example, one known technique in the prior art is the Equality of Opportunities in Supervised Learning technique, which explains observed bias by differences in receiver operating characteristic (ROC) curves of protected and unprotected segments of sensitive attributes, such as age, gender, race, etc. An ROC curve is a graph showing the performance of a classification model at all classification thresholds. However, debiasing in the prior art for such binary choice models has not been adaptable to address bias reduction in multi-choice models.

Recommendation models can utilize predictors for making recommendations customized to specific users. A known technique for debiasing items is the Attributing Fair Decision with Attention Intervention algorithm. However, such a known debiasing algorithm drops predictors, which limits the utility of the recommendation model to make recommendations to users.

SUMMARY OF THE DISCLOSURE

According to an embodiment consistent with the present disclosure, a system and method are configured to detect bias and to perform debiasing. The detection of bias and the debiasing are performed during step 26 in FIG. 1 and the detection and debiasing step 64 in FIG. 2. Such bias detection and debiasing is applied to items, which includes data, ideas, and processes. Items, such as ideas, can be used in models, algorithms, recommendations from a recommendation model, scores of recommendations from a recommendation model, marketing campaigns, etc. The system and method are adaptable to perform bias reduction in multi-choice models.

In an embodiment, a debiasing system is configured to debias model scores of an item from a recommendation model. The debiasing system comprises a hardware-based processor, a memory, and a set of modules. The memory is configured to store instructions and is configured to provide the instructions to the hardware-based processor. The set of modules is configured to implement the instructions provided to the hardware-based processor. The set of modules includes a fairness ratio determining module, a score sorting module, a thresholding module, and a score adjustment module. The fairness ratio determining module is configured to determine a fairness ratio from the model scores. The score sorting module is configured to sort the model scores into an ordered list of scores. The thresholding module is configured to determine the case that a sorted score in the ordered list is within a range of predetermined upper and lower thresholds. The score adjustment module is configured to adjust the sorted score. The fairness ratio determining module is further configured to recompute the fairness ratio from the adjusted sorted score. In the case that the recomputed fairness ratio is within the range, thereby debiasing the model scores, the score adjustment module is configured to generate and output a message with the adjusted sorted score to a recommendation engine. The recommendation engine generates and outputs a recommendation based on the adjusted sorted score. In the case that the recomputed fairness ratio is not within the range, the score adjustment module further adjusts the sorted score until a corresponding fairness ratio of the adjusted sorted score is within the range.

The fairness ratio determining module can be configured to determine the fairness ratio using a predetermined metric. The fairness ratio can be configured to quantify bias of the item. The fairness ratio can be unitless. The ordered list of scores can be a list of the scores in decreasing magnitude. The range can include the upper and lower thresholds. The upper threshold can be 1.20. The lower threshold can be 0.80. The score adjustment module can be configured to communicate with the recommendation model to generate a new model score as the adjusted score having an incremented fairness ratio.

In another embodiment, a method is configured to debias model scores of an item from a recommendation model, comprising determining a fairness ratio from the model scores, sorting the model scores into an ordered list of scores, determining the case that a sorted score in the ordered list is within a range of predetermined upper and lower thresholds, adjusting the sorted score, and recomputing the fairness ratio from the adjusted sorted score. In the case that the recomputed fairness ratio is not within the range, the method further adjusts the sorted score until a corresponding fairness ratio of the adjusted sorted score is within the range. In the case that the recomputed fairness ratio is within the range, thereby debiasing the model scores, the method generates and outputs a message with the adjusted sorted score to a recommendation engine, which generates and outputs a recommendation based on the adjusted sorted score.

Determining the fairness ratio can use a predetermined metric. Adjusting the sorted score can include communicating with the recommendation model, and generating a new model score as the adjusted score having an incremented fairness ratio. The fairness ratio can be configured to quantify bias of the item. The ordered list of scores can be a list of the scores in decreasing magnitude. The range can include the upper and lower thresholds.

In a further embodiment, a non-transitory computer-readable medium stores instructions executable by a processor to debias model scores of an item from a recommendation model, with the instructions comprising determining a fairness ratio from the model scores, sorting the model scores into an ordered list of scores, determining the case that a sorted score in the ordered list is within a range of predetermined upper and lower thresholds, adjusting the sorted score, and recomputing the fairness ratio from the adjusted sorted score. In the case that the recomputed fairness ratio is not within the range, the instructions further adjust the sorted score until a corresponding fairness ratio of the adjusted sorted score is within the range. In the case that the recomputed fairness ratio is within the range, thereby debiasing the model scores, the instructions generate and output a message with the adjusted sorted score to a recommendation engine, and generate and output a recommendation based on the adjusted sorted score.

Determining the fairness ratio can use a predetermined metric. The adjusting of the sorted score can include communicating with the recommendation model, and generating a new model score as the adjusted score having an incremented fairness ratio. The fairness ratio can be configured to quantify bias of the item. The ordered list of scores can be a list of the scores in decreasing magnitude.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIGS. 6-15 illustrate debiasing of a single idea.

FIGS. 16-22 illustrate debiasing of multiple ideas.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system 100 and method 500 configured to detect bias and to perform debiasing of items, which can include data, ideas, and processes.

Figure 1:
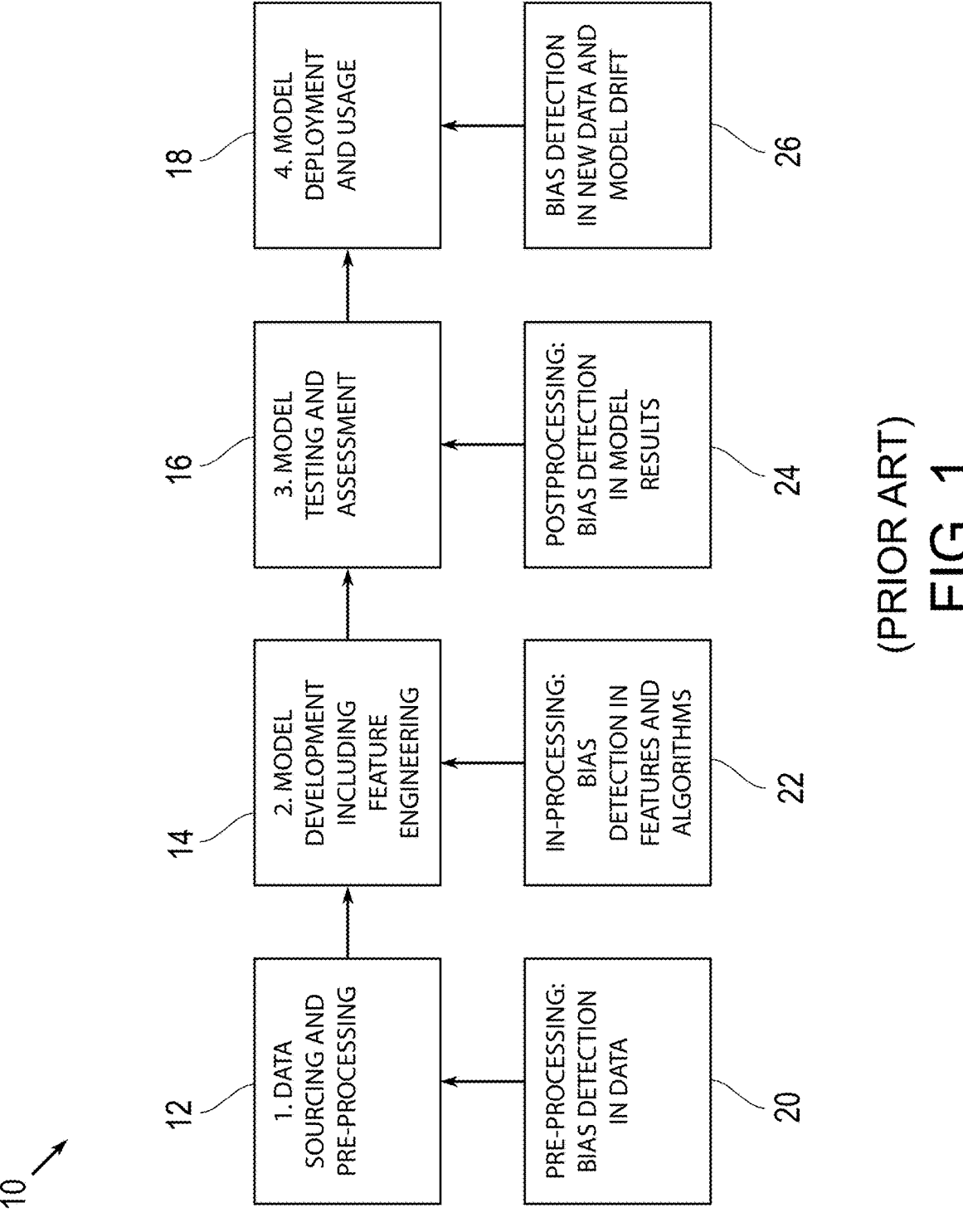
FIG. 1 is a method illustrating bias testing in a model lifecycle in the prior art.
Figure 2:
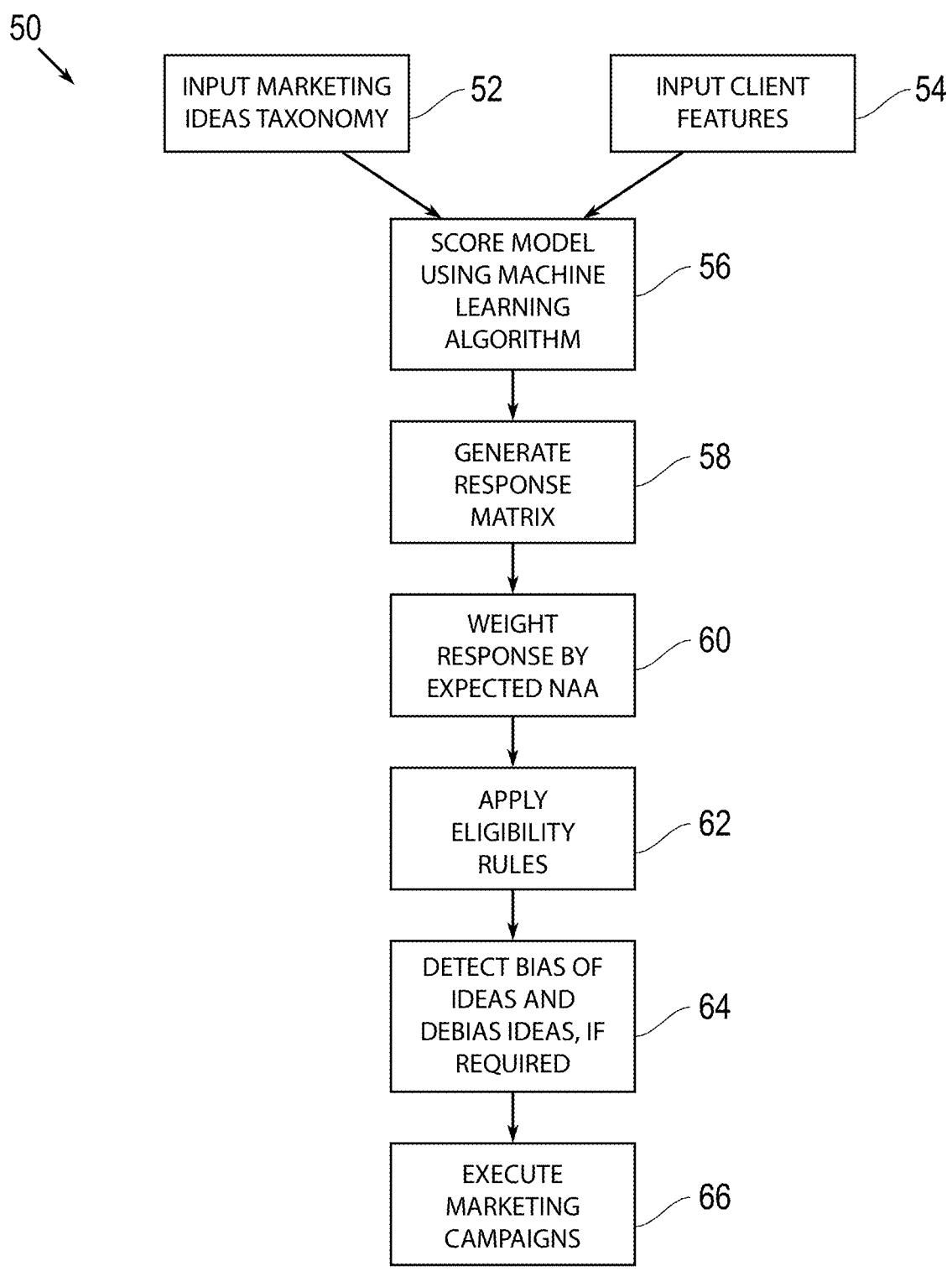
FIG. 2 is a method illustrating model deployment and usage in the prior art.
Figure 3:
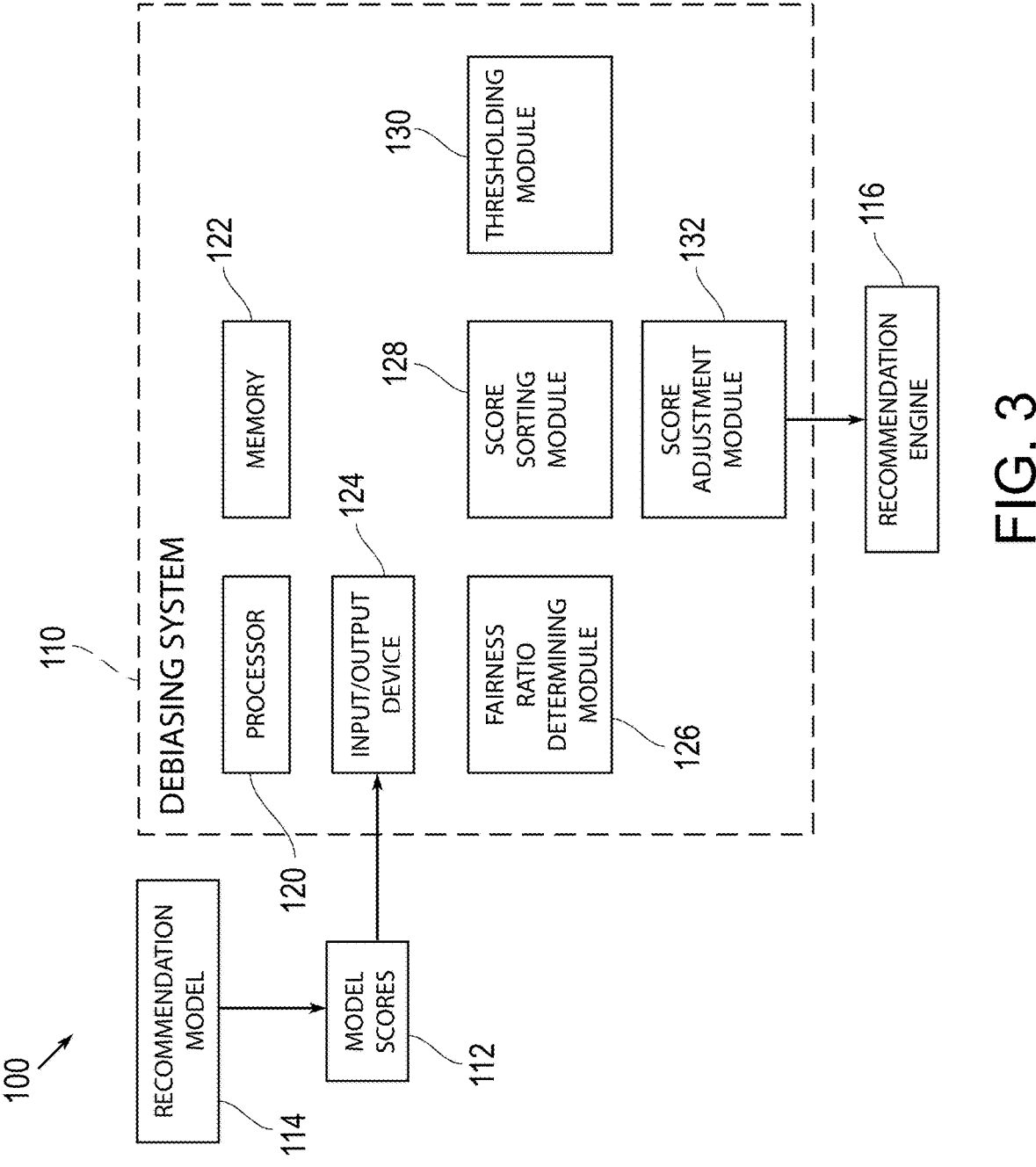
FIG. 3 is a schematic of a system, according to an embodiment.

Referring to FIG. 3, the system 100 includes a debiasing system 110 which receives recommendation model scores 112 from a recommendation model 114, and generates and outputs debiased model scores to a recommendation engine 116. The recommendation engine 116 can be any known system configured to generate a recommendation using the recommendation model 114. Such recommendations can include movies, purchases, financial instruments, and financial choices for a user, including investments, certificates of deposit (CDs), interest rates of loans, etc. The recommendations provide by the recommendation engine 116 can be sensitive to different attributes of users, such as age, gender, race, etc. The debiasing system 110 includes a hardware-based processor 120, a memory 122 configured to store instructions and configured to provide the instructions to the hardware-based processor 120, an input/output device 124, and a set of modules 126, 128, 130, 132 configured to implement the instructions provided to the hardware-based processor 120. The hardware-based processor 120 can include computer hardware.

The set of modules 126, 128, 130, 132 can include a fairness ratio determining module 126, a score sorting module 128, a thresholding module 130, and a score adjustment module 132. The set of modules 126, 128, 130, 132 operate as described below. In particular, the score adjustment module 132 generates and outputs a message or data signal including the debiased model scores to the recommendation engine 116 as described below. The recommendation engine 116 extracts the debiased model scores from the message or data signal, and generates and outputs a recommendation message or a recommendation data signal to a user or a third-party including a recommendation for movies, purchases, financial instruments, and financial choices for a user, including investments, certificates of deposit (CDs), interest rates of loans, etc.

Figure 4:
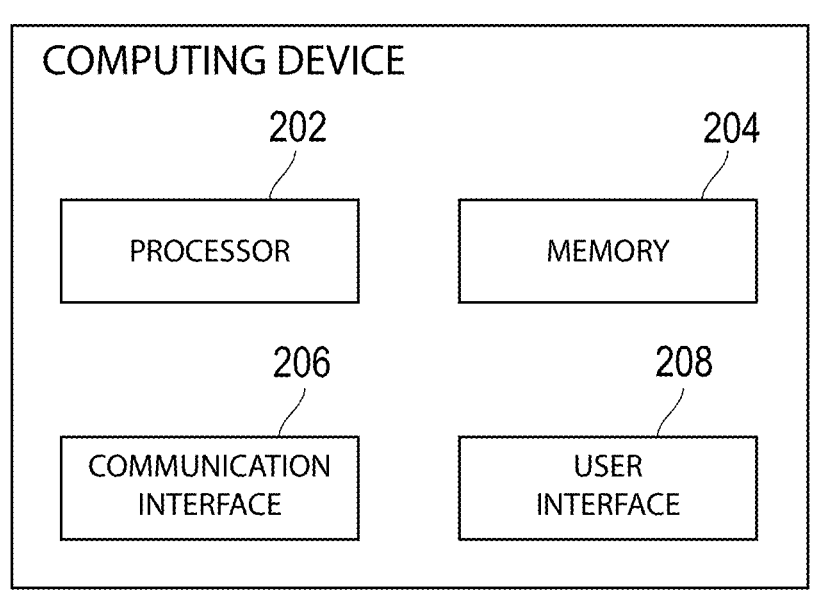
FIG. 4 is a schematic of a computing device used in the system of FIG. 3.

FIG. 4 illustrates a schematic of a computing device 200 including a processor 202 having code therein, a memory 204, and a communication interface 206. Optionally, the computing device 200 can include a user interface 208. The processor 202, the memory 204, the communication interface 206, and the user interface 208 can be operatively connected to each other via any known connections, such as a system bus, a network, etc. Any component, module, or combination of components and modules of the system 100 in FIG. 3 can be implemented by a respective computing device 200. For example, each of the input/output device 124, the fairness ratio determining module 126, the score sorting module 128, the thresholding module 130, and the score adjustment module 132 shown in FIG. 3 can be implemented by one or more of the computing devices 200 shown in FIG. 4 and described below, with the processor 202 being configured by code that implements the respective modules 126, 128, 130, 132, as discussed further below. Alternatively, at least one of the respective modules 126, 128, 130, 132 can be implemented as systems or subsystems using hardware-based processors, as described above. In a further alternative embodiment, at least one of the respective modules 126, 128, 130, 132 can be implemented as software in the form of code or instructions executed by systems or sub-systems using hardware-based processors, as described above.

It is to be understood that the computing device 200 can include different components. Alternatively, the computing device 200 can include additional components. In another alternative embodiment, some or all of the functions of a given component can instead be carried out by one or more different components. The computing device 200 can be implemented by a virtual computing device. Alternatively, the computing device 200 can be implemented by one or more computing resources in a cloud computing environment. Additionally, the computing device 200 can be implemented by a plurality of any known computing devices.

The processor 202 can implement the hardware-based processor 120 in FIG. 3. The processor 202 can include one or more general-purpose processors, such as hardware processors. Alternatively, the processor 202 can include one or more special-purpose processors. The processor 202 can be integrated in whole or in part with the memory 204, the communication interface 206, and the user interface 208. In another alternative embodiment, the processor 202 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 202 can include a plurality of processing elements configured to perform parallel processing. In a further alternative embodiment, the processor 202 can include a plurality of nodes or artificial neurons configured as an artificial neural network. The processor 202 can be configured to implement any known artificial neural network, including a convolutional neural network (CNN).

The memory 204 can implement the memory 122 in FIG. 3. The memory 204 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 202 can be stored in a memory internal to the processor 202. The code can be instructions implemented in hardware. Alternatively, the code can be instructions implemented in software. For example, the code or instructions of the processor 202 can be written in any known programming language, such as PYTHON. In another alternative embodiment, the instructions can be machine-language instructions executable by the processor 202 to cause the computing device 200 to perform the functions of the computing device 200 described herein. Alternatively, the instructions can include script instructions executable by a script interpreter configured to cause the processor 202 and computing device 200 to execute the instructions specified in the script instructions. In another alternative embodiment, the instructions are executable by the processor 202 to cause the computing device 200 to execute an artificial neural network.

The memory 204 can store data in any known format, such as databases, data structures, data lakes, or network parameters of a neural network. The data can be stored in a table, a flat file, data in a filesystem, a heap file, a B+ tree, a hash table, or a hash bucket. The memory 204 can be implemented by any known memory, including random access memory (RAM), cache memory, register memory, or any other known memory device configured to store instructions or data for rapid access by the processor 202, including storage of instructions during execution.

The communication interface 206 can be any known device configured to perform the communication interface functions of the computing device 200 described herein. The communication interface 206 can implement wired communication between the computing device 200 and another entity. Alternatively, the communication interface 206 can implement wireless communication between the computing device 200 and another entity. The communication interface 206 can be implemented by an Ethernet, Wi-Fi, Bluetooth, or USB interface. The communication interface 206 can transmit and receive data over a network and to other devices using any known communication link or communication protocol.

The user interface 208 can be any known device configured to perform user input and output functions. For example, the user interface 208 can be implemented by the input/output device 124 in FIG. 3. The user interface 208 can be configured to receive an input from a user. Alternatively, the user interface 208 can be configured to output information to the user. The user interface 208 can be a computer monitor, a television, a loudspeaker, a computer speaker, or any other known device operatively connected to the computing device 200 and configured to output information to the user. A user input can be received through the user interface 208 implementing a keyboard, a mouse, or any other known device operatively connected to the computing device 200 to input information from the user. Alternatively, the user interface 208 can be implemented by any known touchscreen. The computing device 200 can include a server, a personal computer, a laptop, a smartphone, or a tablet.

Figure 5:
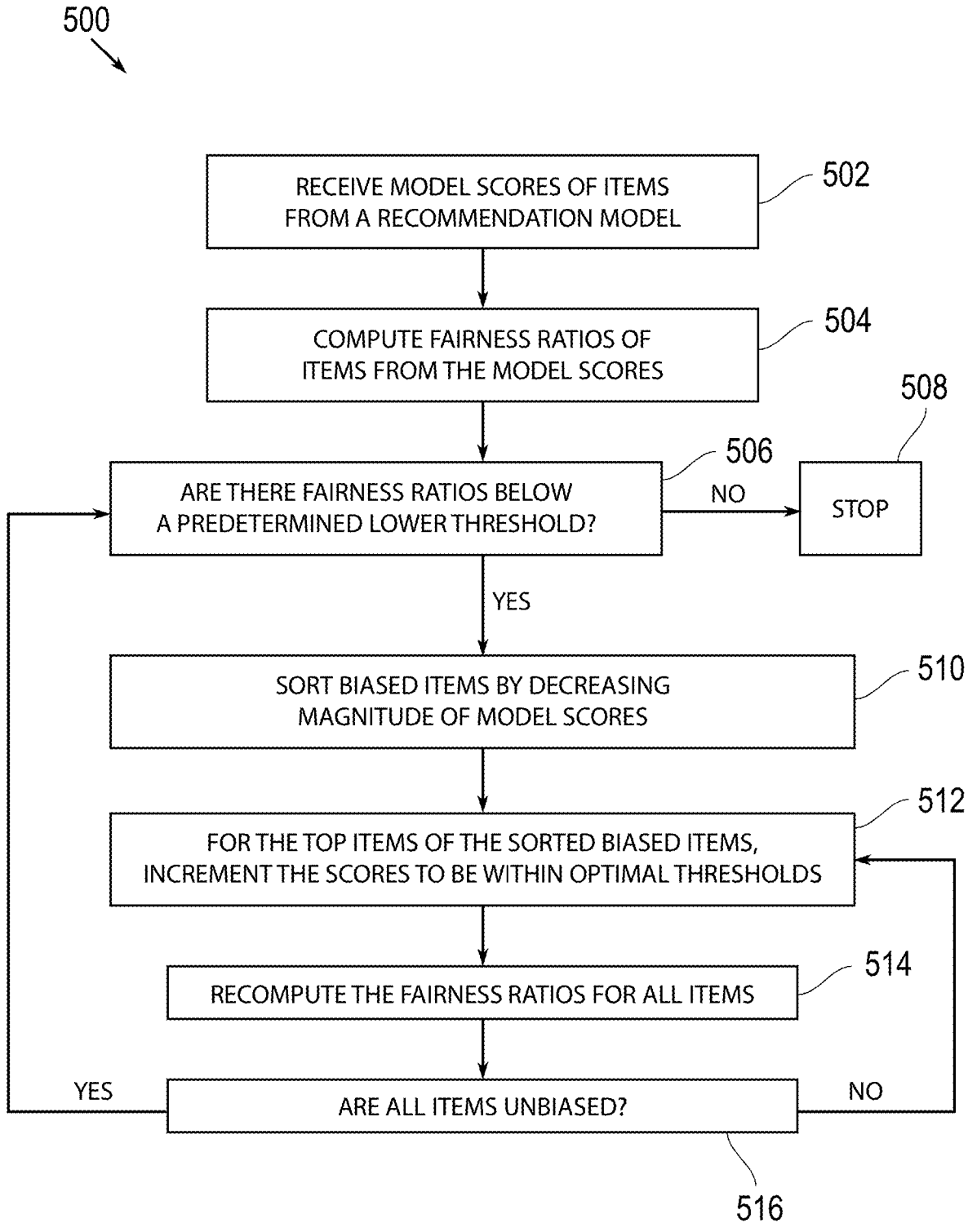
FIG. 5 is a flowchart of a method of operation of the system of FIG. 3.

Referring to FIG. 5, the method 500 includes the step 502 of receiving the model scores 112 of items from a recommendation model 114. The model scores 112 can be received by the input/output device 124. The method 500 then computes fairness ratios of items from the model scores 112
in step 504. The fairness ratios can be computed using the
fairness ratio determining module 126 in FIG. 3. The fair-
ness ratios can be any known predetermined metric, imple-
mented by the fairness ratio determining module 126, for
quantifying the bias of items of multi-choice recommenda-
tion models. Such fairness ratios can normalize the model
scores to be unitless, and therefore are conditioned for direct
comparison to predetermined thresholds, as described
below.

In one example of determining and adjusting fairness
ratios using predetermined methods of processing data, such
as involving counts of households and the age of customers
in financial programs, debiasing is performed on one item,
such as a single idea, as shown in FIGS. 6-15. Referring to
FIG. 6, a plurality of example ideas for financial programs,
such as "Set up Recurring Deposits" and "Open an IRA—
Awareness", are listed in the first column with ID numbers
and descriptions. Such ideas are listed with various associ-
ated data, such as "HH Count (All Ranks)" and "HH Count
(Top 4 Ranks)", with "HH" being an abbreviation for
"household". One column labelled "A" lists the percentage
of households determined by the Top 4 Ranks divided by the
count of All Ranks. Another column labelled "B" lists the
percentage of households having ages 62+ determined by
the Top 4 Ranks divided by the count of All Ranks of
households having ages 62+. From columns A and B,
fairness ratios are determined by respective values from
column B divided by the respective values from column A,
as listed in the last column.

As shown in FIG. 6, out of twenty-three listed ideas
having fairness ratio values below the minimum threshold of
0.80, one idea, having ID number ML0012A and corre-
sponding to an Options Education financial program, has a
fairness ratio value of 0.795. Referring to FIGS. 7-9, for the
Options Education financial program, FIG. 7 illustrates
deciles meeting minimum bounds, FIG. 8 illustrates the
deciles and the cumulative percentage distribution for
households having ages greater than or equal to 62, and FIG.
9 illustrates the deciles and the cumulative percentage
distribution for households having ages less than 62. For the
Options Education financial program, the trend shown in
FIG. 9 for top two deciles being greater than those of other
ideas reverses for the households having ages greater than or
equal to 62. Such a reversal of the trend causes bias.

To debias the scores for the Options Education financial
program, out of the twenty-three ideas, ten ideas have at
least five hundred households in the top four ranks. Such ten
ideas are selected to compare the score and household
distributions. Ideas in the top four ranks constitute about
17% of the overall ideas scores, as represented by the top
two deciles; that is, 4/23 equals about 0.17. Out of the ten
ideas, the Options Education idea competes with the four
ideas with higher or similar scores in the top two deciles to
attain a place in the top four ranks. In the example shown in
FIGS. 7-9, the four ideas are "Tango—Digital", "Consoli-
date Assets", "Q2 Special Offer", and "Driver Options
Usage". Among the five ideas, namely, the Options Educa-
tion idea and the four ideas with top ranks listed above, the
top two deciles with cumulative percentages of households
with age less than 62 for the Options Education idea are
higher than the top two deciles of the other four ideas. As
described above, the trend reverses in the case of households
with age greater than or equal to 62, causing the fairness
ratio metrics to be lower than 0.80.

Referring to FIGS. 10-13, in the present example, score
increments on each of the two four percentiles are tested to measure a reduction in bias. Bias is reduced by increasing
the count of the households with ages greater than or equal
to 62 with the Options Education idea included in the top
four ranks. The increase in the count causes the scores of the
top percentile to be incremented. That is, before increment-
ing, the scores in the top percentile range from about 0.1654
to about 0.6623. After the increase in the count, the scores
in the top percentile range are incremented to the maximum
score, to be in the range from about 0.6622 to about 0.6623.
After the incrementing, the scores retain their rank order.
Similar score increments are tested on the second, third, and
fourth percentiles, as shown in FIGS. 14-15. Referring to
FIG. 14, score increments of the second percentile improves
the fairness ratio of Options Education from about 0.795 to
about 2.581. The bias of other ideas remains acceptable, and
the distribution change in the household counts for the top
four ranks is about 0.003%. Referring to FIG. 15, score
increments of the third percentile improves the fairness ratio
of Options Education from about 0.795 to about 0.801. The
bias of other ideas remains acceptable, and the distribution
change in the household counts for the top four ranks is
about 0.00009%.

In another example of determining and adjusting fairness
ratios using predetermined methods of processing data, such
as involving counts of households and the age of customers
in financial programs, debiasing is performed on multiple
items, such as multiple ideas, as shown in FIGS. 16-22.
Referring to FIG. 16, six out of sixteen ideas have fairness
ratio values below the threshold of 0.80; namely, idea 1A has
a fairness ratio value of about 0.485; ideas 4A, 5A, and 7A
have low data values or low fairness ratio values and low
proportions of households in the top four ranks; and ideas
10A and 12A have fairness ratio values which are borderline
with the threshold of 0.80. In particular, idea 7A for "Set up
AIP" has extremely small data values as well as incomplete
data, and so has a nominal or default fairness ratio value of
0.000.

To debias multiple ideas, one example approach is to
debias the ideas one at a time in the order of decreasing
scores of the ideas. Such an approach prevents a debiased
idea from being biased in subsequent steps. As shown in
FIG. 17, out of the sixteen ideas listed in FIG. 16, thirteen
ideas are selected to compare the scores and household
distributions. Each of the thirteen ideas are selected by a
predetermined criterion. For example, the predetermined
criterion can be ideas having at least five hundred house-
holds in the top four ranks. Ideas in the top four ranks
constitute about 25% of the overall ideas scores, represented
by the top three deciles, since 4/16 equals about 0.25.

In the example approach, the ideas which require debi-
asing are the ideas which have relatively lower volumes of
households in the top four ranks. Using a minimum bound
of scores in the top decile, as shown in FIG. 17, the order of
debiasing of ideas can be "Drive Options Usage", "Options
Education", "Set up Recurring Deposits", "Open Core Port-
folio", "Refer a Friend", and "Set up AIP". Referring to FIG.
18, for each idea to be debiased, the scores of selected
percentiles are incremented to be closer to the upper bound
of the score range. Starting with Drive Options Usage, bias
is reduced by increasing the count of households with ages
greater than or equal to 62 years. The Drive Options Usage
idea is in the top four ranks, and so scores of the top
percentile are incremented to be closer to the upper bound of
the first percentile of the Drive Options Usage idea. Such
debiasing raises the fairness ratio of the Drive Options
Usage idea from about 0.799 to about 0.957, as shown in
FIG. 19. The scores of ideas retain their rank order. Bias is then reduced for the Options Education idea by increasing the count of households with ages greater than or equal to 62 years. The Options Education idea is in the top four ranks, and so scores of the top percentile are incremented to be closer to the upper bound of the first percentile of the Options Education idea. Such debiasing raises the fairness ratio of the Options Education idea from about 0.798 to about 0.952, as shown in FIG. 19. The scores of ideas again retain their rank order. Referring to FIG. 19, after the debiasing of the Drive Options Usage idea and the Options Education idea, the bias of other ideas remains acceptable, and the distribution change in household counts for the top four ranks is about 0.067%.

Referring again to FIG. 17, bias reduction is next performed for the Setup Recurring Deposits idea, by incrementing the scores of the top three percentiles to be closer to the upper bound of the first percentile. Such debiasing raises the fairness ratio of Setup Recurring Deposits idea from about 0.485 to about 0.904, as shown in FIG. 20. Bias reduction is then performed for the Open Core Portfolio idea, by incrementing the scores of the second percentile, the third percentile, and the upper half of the fourth percentile to be closer to the upper bound of the second percentile. Such debiasing raises the fairness ratio of the Open Core Portfolio idea from about 0.463 to about 0.924, as shown in FIG. 20. Referring to FIG. 20, after the debiasing of the Setup Recurring Deposits idea and the Open Core Portfolio idea, the bias of other ideas remains acceptable, and the distribution change in household counts for the top four ranks is about 0.245%.

Bias reduction is next performed for the Refer a Friend idea, by incrementing the scores of the second percentile, the third percentile, and the upper half of the fourth percentile to be closer to the upper bound of the second percentile. Such debiasing raises the fairness ratio of the Refer a Friend idea from about 0.199 to about 0.855, as shown in FIGS. 21-22. Referring to FIG. 21, after the debiasing of the Refer a Friend idea, the bias of other ideas remains acceptable, and the distribution change in household counts for the top four ranks is about 0.247%. Bias reduction is finally performed for the Setup AIP scores. As described above, since the Setup AIP idea has extremely small data values as well as incomplete data, the Setup AIP idea has a nominal or default fairness ratio value of about 0.000, as shown in FIG. 18. Initially, the data entries for debiasing the Setup AIP ideas are blank, as shown in FIG. 21. However, after debiasing, the new fairness ratio for the Setup AIP idea is about 1.004, as shown in in FIGS. 18 and 22.

Referring back to FIG. 5, the method 500 then determines whether there are fairness ratios below a predetermined lower threshold in step 506. The determination in step 506 can be performed by the thresholding module 130 in FIG. 3. The predetermined lower threshold can be, for example, 0.80. The predetermined lower threshold can be stored in the memory 122. The predetermined lower threshold can be set by default. Alternatively, the predetermined lower threshold can be set by a system administrator or operator of the debiasing system 110. For example, the system administrator can input the predetermined lower threshold using the input/output device 124. If no fairness ratios are below the predetermined lower threshold, then the method 500 stops in step 508, and the current model scores 112 are provided to the recommendation engine 116.

However, if there are fairness ratios below the predetermined lower threshold, then bias is present in the items. Then the method 500 sorts the biased items into an ordered list of scores in step 510. For example, the biased items in the ordered list can be arranged by decreasing magnitude of the model scores 112 in step 510. The sorting in step 510 can be performed by the score sorting module 128 in FIG. 3. The sorting of model scores is performed to generate an order corresponding to decreasing model scores. A higher average model score of an item correlates with a higher importance, and so debiasing is performed for the items with the highest importance. The method 500 takes the top items of the sorted biased items, and increments the corresponding scores of such top items to be within optimal thresholds of fairness ratios in step 512. The thresholding module 130 in FIG. 3 can be used to compare the scores of the top items to the optimal thresholds of fairness ratios stored in the memory 122. Accordingly, the present debiasing technique used in the system 100 and method 500 increments a lowest possible volume of scores necessary to debias an item. The present debiasing technique identifies such a lowest possible volume by considering all possible scenarios of volume increments which lead to debiasing the item.

The top items can be the item with the highest model score, which in turn indicates an item with a highest fairness score. Alternatively, the top items can be a predetermined set of items with the highest model scores. The predetermined set of items can be, for example, the upper five items with the highest model scores. The number of the predetermined set of items can be set by default, or can be set by a system administrator or operator of the debiasing system 110. For example, the system administrator can input the predetermined number of the topmost items using the input/output device 124. Higher score magnitudes, and in turn higher corresponding fairness scores, correlate with a lower quantity of model recommendations needed to be debiased by incrementation of model scores.

The optimal thresholds of fairness ratios can be 0.80 and 1.20, such that fairness ratios are to be in the range between 0.80 and 1.20, inclusive. A value outside of this range of fairness ratios is considered to indicate bias with regard to the corresponding item. Each optimal threshold can be stored in the memory 122. The optimal thresholds for evaluating fairness ratios can be based on a set of predetermined business rules. The predetermined business rules can be stored in the memory 122. The predetermined business rules can be implemented by the processor 120. In an example embodiment, a business rule can include a timer determining when a recommendation is repeated to a user, such as a recommended financial instrument, a movie, or a purchase. Alternatively, each optimal threshold can be set by default, or can be set by a system administrator or operator of the debiasing system 110. For example, the system administrator can input the optimal thresholds using the input/output device 124.

The incrementing of the corresponding scores of such top items to be within the optimal thresholds in step 512 can be performed using a predetermined increment size. For example, the predetermined increment size can be 0.01, or 0.05, or 0.10. Alternatively, the predetermined increment size can be a percentage, such as 10% or 20%. The predetermined increment size can be set by default, or can be set by a system administrator or operator of the debiasing system 110. For example, the system administrator can input the predetermined increment size using the input/output device 124. In an example embodiment, the model scores 112 can represent a recommendations for an item in a population, such as items in one-hundred households, or items in one-hundred households with people having ages greater than or equal to 62 years old. The items can be incentives for opening individual retirement accounts (IRAs), awareness values for opening IRAs, setting up recurring deposits, options for education, consolidation of assets, etc. Numerical examples of such items are shown in Table 1 below:

TABLE 1

| ITEM | % HOUSEHOLDS | % HOUSEHOLDS AGE 62+ | FAIRNESS RATIO |
|---|---|---|---|
| Open IRA Incentive | 87.25 | 83.86 | 0.96 |
| Open IRA Awareness | 19.33 | 18.76 | 0.97 |
| Set Up Recurring Deposits | 3.58 | 1.74 | 0.49 |
| Options for Education | 1.74 | 1.39 | 0.79 |
| Consolidate Assets | 99.63 | 99.69 | 1.00 |

In Table 1, for a given row, the fairness ratio in column 4 can be determined by dividing an entry in column 3 by the entry in column 2 in the given row. Alternatively, other known methods for determining a fairness ratio can be used. By incrementing the scores of a given population in step 512 after sorting in step 510, such as incrementing by 10% of the corresponding scores of a volume of scores, debiasing is performed so that bias can be reduced or eliminated. For example, a 10% volume of top scores, that is, a top decile, is incremented for an item, and so the scores are incremented to approach the score near the top of the range of scores. In one embodiment, the incrementing of scores can be performed by increasing a smallest population such as the percentage of households in column 2 of Table 1. In another embodiment, the incrementing of scores can be performed by modifying the ages in the households involving the item in column 3 of Table 1. As shown in column 3 of Table 1, the ages are greater than or equal to 62, but the minimum age of 62 can be modified to a new minimum age value. By using the score adjustment module 132, such increases in population or modifications of ages employed in the recommendation model 114 alter and thus adjust the scores. In one embodiment, the score adjustment module 132 can be operatively connected to the recommendation model 114 to modify the operating parameters of the recommendation model 114 to generate updated scores, such as incremented scores. In another embodiment, the debiasing system 110 can implement the recommendation model 114 using the processor 120, so that the operating parameters of the recommendation model 114 can be directly modified to generate updated scores, such as incremented scores. The memory 122 can store the current operating parameters of the recommendation model 114. In addition, the processor 120 can modify the operating parameters automatically using predetermined code. Alternatively, a system administrator can manually modify the operating parameters used by the recommendation model 114.

After step 512, all of the fairness ratios of all of the items are recomputed in step 514, for example, using the fairness ratio determining module 126 in FIG. 3. The method 500 then determines whether all of the items are unbiased in step 516. For example, the top items are evaluated to insure that their corresponding fairness ratios, after the re-computation in step 514, are within the optimal thresholds. In addition, items which were previously considered unbiased due to their fairness scores being higher than the predetermined lower thresholds are evaluated as to whether the previously unbiased items remain unbiased. For example, in step 516, the method 500 determines that their fairness scores of such previous unbiased items, after the re-computation in step 514, are still within the optimal thresholds described above.

If all of the items are determined to not be unbiased in step 516, the method 500 loops back to perform step 512 to increment the scores of the top items to be within the optimal thresholds. Otherwise, if all of the items are determined to be unbiased in step 516, the method 500 loops back to perform step 506 to again determine whether there are any recomputed fairness scores below the predetermined lower threshold. Such looping back to step 506 continues until step 508 is performed, as described above. The system 100 and method 500 then generate and output a message or data signal, as described above, including the debiased model scores to the recommendation engine 116. The recommendation engine 116 extracts the debiased model scores from the message or data signal, and generates and outputs a recommendation message or a recommendation data signal to a user or a third-party including a recommendation for movies, purchases, financial instruments, and financial choices for a user, including investments, certificates of deposit (CDs), interest rates of loans, etc.

Such debiasing of items described above is industry agnostic as well as model agnostic for any known recommendation engine 116. Accordingly, the system 100 and method 500 described above can work well to perform debiasing of items for any large scale recommendation engine 116, including if the total number of items in the multi-choice model is less than fifty items. The debiasing of model recommendations by the system 100 and method 500 can be performed quickly, for example, within a day. Therefore, there is minimal lag between generating model recommendations and using such recommendations, such as in marketing campaigns. In addition, the system 100 and method 500 can implement recommendations as predictors without dropping any predictors. In addition, the introduction of new rules such as a new financial regulation or a new marketing campaign does not change the system 100 and method 500, which can be extended to incorporate such new rules.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A debiasing system configured to debias model scores of a plurality of items from a recommendation model operating in accordance with operating parameters, comprising:

a hardware-based processor;

a memory configured to store instructions and the operating parameters of the recommendation model, and configured to provide the instructions to the hardware-based processor; and a set of modules configured to implement the instructions provided to the hardware-based processor, the set of modules including:

a fairness ratio determining module configured, responsive to receiving the model scores of the plurality of items from the recommendation model, to determine a fairness ratio from the model scores of the plurality of items;

a score sorting module configured to sort the model scores into an ordered list of scores ordered in decreasing magnitude;

a thresholding module configured to process each sorted model score in the order of the decreasing magnitude to determine the case that a sorted score in the ordered list is within a range of predetermined upper and lower thresholds; and a score adjustment module operatively connected to the recommendation model and configured to process each sorted model score in the order of the decreasing magnitude to evaluate each sorted score in the ordered list for bias, to update the operating parameters of the recommendation model to adjust each sorted score to be within the range to debias each sorted model score in the order of the decreasing magnitude, thereby preventing a debiased sorted model score from being biased in subsequent steps of debiasing due to adjusting of other sorted scores, and to store the updated operating parameters in the memory, wherein the fairness ratio determining module is configured to recompute the fairness ratio from each adjusted sorted score, wherein, in the case that the recomputed fairness ratio is within the range, thereby debiasing the model scores of the plurality of items, the score adjustment module is configured to generate and output a message with the adjusted sorted score to a computer-system based recommendation engine, wherein, in the case that the recomputed fairness ratio is within the range, the computer-system based recommendation engine, using the adjusted sorted score, generates and outputs a debiased recommendation to a user from the computer-system based recommendation engine within one day of receiving the model scores, thereby improving the operation and functionality of the computer-system based recommendation engine to provide improved recommendations, which have been rapidly debiased, to the user, and wherein, in the case that the recomputed fairness ratio is not within the range, the score adjustment module further adjusts the sorted score until a corresponding fairness ratio of the adjusted sorted score is within the range.

2. The debiasing system of claim 1, wherein the fairness ratio determining module is configured to determine the fairness ratio using a predetermined metric.

3. The debiasing system of claim 1, wherein the fairness ratio is configured to quantify bias of each of the plurality of items.

4. The debiasing system of claim 1, wherein the fairness ratio is unitless.

5. The debiasing system of claim 1, wherein the range includes the upper and lower thresholds.

6. The debiasing system of claim 1, wherein the upper threshold is 1.20.

7. The debiasing system of claim 1, wherein the lower threshold is 0.80.

8. The debiasing system of claim 1, wherein the score adjustment module is configured to communicate with the recommendation model to generate a new model score as the adjusted score having an incremented fairness ratio.

9. A computer-based method configured to debias model scores of a plurality of items from a recommendation model operating in accordance with operating parameters, comprising:

receiving the model scores of the plurality of items from the recommendation model;

providing a memory storing the operating parameters;

determining a fairness ratio from the model scores;

sorting the model scores of the plurality of items into an ordered list of scores ordered in decreasing magnitude;

evaluating each sorted score in the ordered list for bias to process each sorted model score in the order of the decreasing magnitude;

determining the case that, for each sorted model score in the order of the decreasing magnitude, each sorted score in the ordered list is within a range of predetermined upper and lower thresholds;

updating the operating parameters of the recommendation model;

adjusting each sorted score using the updated operating parameters to be within the range to debias each sorted model score in the order of the decreasing magnitude, thereby preventing a debiased sorted model score from being biased in subsequent steps of debiasing due to adjusting of other sorted scores;

storing the updated operating parameters in the memory;

recomputing the fairness ratio from each adjusted sorted score;

in the case that the recomputed fairness ratio is not within the range, further adjusting the sorted score until a corresponding fairness ratio of each adjusted sorted score is within the range;

in the case that the recomputed fairness ratio is within the range, thereby debiasing the model scores of the plurality of items, generating and outputting a message with each adjusted sorted score to a computer-system based recommendation engine; and in the case that the recomputed fairness ratio is within the range, generating and outputting, using each adjusted sorted score, a debiased recommendation to a user from the computer-system based recommendation engine within one day of receiving the model scores, thereby improving the operation and functionality of the computer-system based recommendation engine to provide improved recommendations, which have been rapidly debiased, to the user.

10. The computer-based method of claim 9, wherein determining the fairness ratio uses a predetermined metric.

11. The computer-based method of claim 9, wherein adjusting the sorted score includes:

communicating with the recommendation model; and generating a new model score as the adjusted score having an incremented fairness ratio.

12. The computer-based method of claim 9, wherein the fairness ratio is configured to quantify bias of each of the plurality of items.

13. The computer-based method of claim 9, wherein the range includes the upper and lower thresholds.

14. A non-transitory computer-readable medium storing instructions executable by a processor to debias model scores of a plurality of items from a recommendation model operating in accordance with operating parameters, the instructions comprising:

receiving the model scores of the plurality of items from the recommendation model;

storing the operating parameters in a memory;

determining a fairness ratio from the model scores of the plurality of items;

sorting the model scores into an ordered list of scores, ordered in decreasing magnitude;

evaluating each sorted score in the ordered list for bias to process each sorted model score in the order of the decreasing magnitude;

determining the case that, for each sorted model score in the order of the decreasing magnitude, each sorted score in the ordered list is within a range of predetermined upper and lower thresholds;

updating the operating parameters of the recommendation model;

adjusting each sorted score using the updated operating parameters to be within the range to debias each sorted model score in the order of the decreasing magnitude, thereby preventing a debiased sorted model score from being biased in subsequent steps of debiasing due to adjusting of other sorted scores;

storing the updated operating parameters in the memory;

recomputing the fairness ratio from each adjusted sorted score;

in the case that the recomputed fairness ratio is not within the range, further adjusting each sorted score until a corresponding fairness ratio of each adjusted sorted score is within the range;

in the case that the recomputed fairness ratio is within the range, thereby debiasing the model scores of the plurality of items, generating and outputting a message with each adjusted sorted score to a computer-system based recommendation engine; and in the case that the recomputed fairness ratio is within the range, generating and outputting, using each adjusted sorted score, a debiased recommendation to a user from the computer-system based recommendation engine within one day of receiving the model scores, thereby improving the operation and functionality of the computer-system based recommendation engine to provide improved recommendations, which have been rapidly debiased, to the user.

15. The non-transitory computer-readable medium of claim 14, wherein determining the fairness ratio uses a predetermined metric.

16. The non-transitory computer-readable medium of claim 14, wherein adjusting the sorted score includes:

communicating with the recommendation model; and generating a new model score as the adjusted score having an incremented fairness ratio.

17. The non-transitory computer-readable medium of claim 14, wherein the fairness ratio is configured to quantify bias of each of the plurality of items.

* * * * *